US010121018B2

United States Patent
Tamayo-Rios et al.

(10) Patent No.: US 10,121,018 B2
(45) Date of Patent: Nov. 6, 2018

(54) SECURE DATA SYNCHRONIZATION

(71) Applicant: Microsoft Technology Licensing, LLC, Redmond, WA (US)

(72) Inventors: Matthew Z. Tamayo-Rios, Seattle, WA (US); Saurav Sinha, Bellevue, WA (US); Ruslan Ovechkin, Redmond, WA (US); Gopinathan Kannan, Redmond, WA (US); Vijay G. Bharadwaj, Sammamish, WA (US); Christopher R. Macaulay, Seattle, WA (US); Eric Fleischman, Redmond, WA (US); Nathan J. Ide, Bothell, WA (US); Kun Liu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 106 days.

(21) Appl. No.: 15/210,112

(22) Filed: Jul. 14, 2016

(65) Prior Publication Data
US 2016/0321464 A1 Nov. 3, 2016

Related U.S. Application Data

(62) Division of application No. 13/230,121, filed on Sep. 12, 2011, now Pat. No. 9,424,439.

(51) Int. Cl.
*H04L 29/06* (2006.01)
*G06F 21/62* (2013.01)
(Continued)

(52) U.S. Cl.
CPC .......... *G06F 21/6218* (2013.01); *G06F 21/44* (2013.01); *G06F 21/6245* (2013.01);
(Continued)

(58) Field of Classification Search
CPC .. G06F 21/6218; G06F 21/6245; G06F 21/44; G06F 21/6272; G06F 2221/2107;
(Continued)

(56) References Cited

U.S. PATENT DOCUMENTS 5,504,895 A  4/1996 Kurosawa et al.
6,671,757 B1  12/2003 Multer et al.
(Continued)

OTHER PUBLICATIONS

"Final Office Action", U.S. Appl. No. 13/230,121, dated Jun. 18, 2015, 21 pages.
(Continued)

*Primary Examiner* — John B King

(57) ABSTRACT

Techniques for secure data synchronization are described. In one or more implementations, a determination is made as to whether enterprise data is stored locally on a first device corresponding to an enterprise device. Based on a determination that the second device is a non-enterprise device, a determination is made as to whether a permission associated with the first device indicates that the first device is permitted to propagate the enterprise data to non-enterprise devices. If the first device lacks permission to propagate the enterprise data to non-enterprise devices, the enterprise data is prevented from being propagated to the second device.

21 Claims, 8 Drawing Sheets

(51) Int. Cl.
*G06F 21/44* (2013.01)
*H04L 29/08* (2006.01)

(52) U.S. Cl.
CPC ...... *G06F 21/6272* (2013.01); *H04L 63/0428* (2013.01); *H04L 63/062* (2013.01); *G06F 2221/2107* (2013.01); *H04L 67/1095* (2013.01); *H04L 67/1097* (2013.01)

(58) Field of Classification Search
CPC ............... H04L 63/062; H04L 63/0428; H04L 67/1095; H04L 67/1097
See application file for complete search history.

(56) References Cited

U.S. PATENT DOCUMENTS

| | | | |
|---|---|---|---|
| 6,854,021 B1* | 2/2005 | Schmidt | G06F 3/0613 709/236 |
| 7,069,330 B1 | 6/2006 | McArdle et al. | |
| 7,155,739 B2 | 12/2006 | Bari et al. | |
| 7,334,013 B1 | 2/2008 | Calinov et al. | |
| 7,428,750 B1 | 9/2008 | Dunn et al. | |
| 8,578,486 B2* | 11/2013 | Lifliand | H04L 63/0428 726/22 |
| 9,026,918 B2 | 5/2015 | Sharoni | |
| 9,342,528 B2* | 5/2016 | Clash | G06F 17/302 |
| 9,424,439 B2 | 8/2016 | Tamayo-Rios et al. | |
| 2001/0007997 A1 | 7/2001 | Fujieda | |
| 2004/0193601 A1 | 9/2004 | Hu et al. | |
| 2005/0289644 A1 | 12/2005 | Wray | |
| 2008/0034419 A1* | 2/2008 | Mullick | H04L 63/0272 726/15 |
| 2009/0013172 A1 | 1/2009 | Ju et al. | |
| 2009/0037336 A1 | 2/2009 | Sunata | |
| 2009/0217056 A1 | 8/2009 | Malpani | |
| 2009/0328154 A1 | 12/2009 | Field et al. | |
| 2010/0299313 A1 | 11/2010 | Orsini et al. | |
| 2011/0093846 A1 | 4/2011 | Moinzadeh et al. | |
| 2011/0126197 A1 | 5/2011 | Larsen et al. | |
| 2011/0145317 A1* | 6/2011 | Serban | H04W 4/00 709/203 |
| 2011/0302215 A1 | 12/2011 | Holleran et al. | |
| 2012/0054841 A1 | 3/2012 | Schultz et al. | |
| 2013/0067243 A1 | 3/2013 | Tamayo-Rios et al. | |
| 2013/0304881 A1 | 11/2013 | Venkatraman et al. | |

OTHER PUBLICATIONS

"Final Office Action", U.S. Appl. No. 13/230,121, dated Jul. 18, 2014, 26 pages.
"Non-Final Office Action", U.S. Appl. No. 13/230,121, dated Jan. 6, 2015, 23 pages.
"Non-Final Office Action", U.S. Appl. No. 13/230,121, dated Feb. 12, 2014, 20 pages.
"Non-Final Office Action", U.S. Appl. No. 13/230,121, dated Oct. 8, 2015, 22 pages.

* cited by examiner

SECURE DATA SYNCHRONIZATION

RELATED APPLICATIONS

This is a divisional application of and claims priority to U.S. patent application Ser. No. 13/230,121, filed Sep. 12, 2011 and titled "Secure Data Synchronization," the disclosure of which is incorporated in its entirety by reference herein.

BACKGROUND

Today's online environment enables users to access their data from a variety of different locations and devices. For example, a particular user can have multiple different devices, such as a desktop computer, a laptop, a smartphone, and so on. Data associated with the user can be synchronized among the multiple different devices using a variety of existing techniques. Current synchronization techniques, however, typically store sensitive user data in high security storage, which can increase the cost of storing such data. Further, existing techniques typically allow data to be synchronized to a device without taking into consideration particular functionalities of the device that should not be permitted to access the data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for secure data synchronization are described. In one or more implementations, techniques may be employed to conserve high cost data storage by storing larger portions of encrypted data in low cost storage, while storing relatively smaller security keys in higher cost storage. A device that is granted access to the security keys can retrieve the encrypted data from the low cost storage and use the security keys to decrypt the encrypted data.

In at least some embodiments, access to data can be controlled based on a correlation between applications that submit data and applications that request data. For example, an application identifier ("ID") can be used to mark a portion of data. When an application requests the portion of data, an application ID for the requesting application can be compared to the application ID used to mark the data. If the application IDs match, the requesting application can be granted access to the data. Otherwise, the requesting application may be denied access to the data.

Further to embodiments, synchronization of enterprise data is controlled based on policies and/or permissions associated with a particular device. For example, if a device is determined to be an enterprise device (e.g., it is associated with enterprise policies and/or permissions), enterprise data may be synchronized to the device. If the device is determined to be a non-enterprise device, enterprise data may not be synchronized to the device unless a user indicates, either implicitly or explicitly, that such synchronization is allowed.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques for secure data synchronization are described. In one or more implementations, techniques may be employed to conserve high cost data storage by storing larger portions of encrypted data in low cost storage, while storing relatively smaller security keys in higher cost storage. A device that is granted access to the security keys can retrieve the encrypted data from the low cost storage and use the security keys to decrypt the encrypted data.

In at least some embodiments, access to data can be controlled based on a correlation between applications that submit data and applications that request data. For example, an application identifier ("ID") can be used to mark a portion of data. When an application requests the portion of data, an application ID for the requesting application can be compared to the application ID used to mark the data. If the application IDs match, the requesting application can be granted access to the data. Otherwise, the requesting application may be denied access to the data.

Further to embodiments, synchronization of enterprise data is controlled based on policies and/or permissions associated with a particular device. For example, if a device is determined to be an enterprise device (e.g., it is associated with enterprise policies and/or permissions), enterprise data may be synchronized to the device. An enterprise entity can also specify policies to prevent personal data, which may be sensitive, from synchronizing with the device. If the device is determined to be a non-enterprise device, enterprise data may not be synchronized to the device unless a user indicates, either implicitly or explicitly, that such synchronization is allowed.

In the following discussion, an example environment and example system are first described that are operable to employ techniques for secure data synchronization described herein. Next, a section entitled "Example Methods" describes example methods which may be employed in the example environment as well as in other environments. Following this, a section entitled "Application-Specific Data" describes embodiments in which access to data can be controlled based on a correlation between applications that submit data and applications that request data. Next, a section entitled "Enterprise Data Synchronization" describes embodiments in which synchronization of enterprise data can be limited to devices with enterprise-type permissions and/or policies. Following this, a section entitled "Revoking Trusted Status" describes embodiments in which a trusted status of a device can be revoked. Last, a section entitled "Example Device" describes aspects of an example device that can be utilized to implement one or more embodiments.

Example Environment and System

Figure 1:
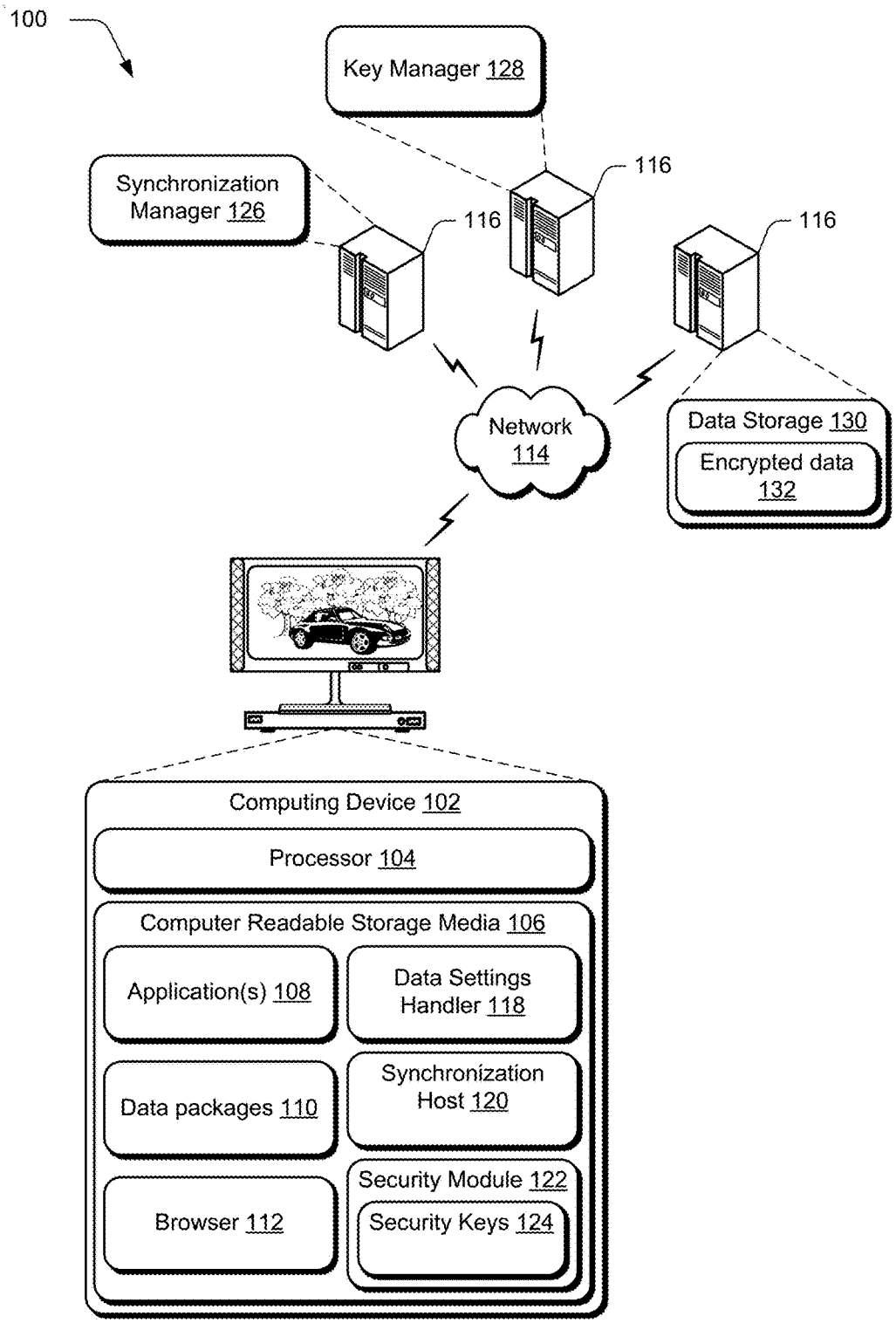
FIG. 1 is an illustration of an environment in an example implementation that is operable to employ techniques for secure data synchronization.

FIG. 1 is an illustration of an environment 100 in an example implementation that is operable to employ techniques for secure data synchronization. Environment 100 includes a computing device 102 having one or more processors 104, one or more computer-readable storage media 106, and one or more applications 108 that reside on the computer-readable storage media 106 and which are executable by the processor 104. Computing device 102 can be embodied as any suitable computing device such as, by way of example and not limitation, a desktop computer, a portable computer, a handheld computer such as a personal digital assistant (PDA), mobile phone, tablet computer, and the like. One of a variety of different examples of a computing device 102 is shown and described below in FIGS. 2 and 8.

The applications 108 are representative of functionalities that enable tasks to be performed via the computing device 102, such as word processing, email, spreadsheet, media content consumption, and so on. One or more of the applications 108 are associated with a unique application identifier ("ID") that enables a particular application to be identified by other entities. For example, when an application is installed on the computing device 102, a unique application ID can be assigned to the application. Further, when a different instance of the application is installed on a different device, the same application ID can be assigned to the different instance. Thus, multiple instances of the same application across multiple devices can have the same application ID. Thus, an instance of the application can provide the application ID when communicating with other entities to enable the application to be identified.

Further to the computing device 102 are one or more data packages 110, which are representative of functionality to store and/or manage data for various entities of the computing device 102. For example, a particular one of the data packages 110 can store data for an associated one of the applications 108, and access to data from the particular data package can be restricted to the associated application. Alternatively or additionally, a particular one of the data packages 110 can be associated with multiple of the applications 108 (e.g., a subset of the applications 108), and thus access to the particular data package can be restricted to the multiple applications.

Access to a particular one of the data packages 110 can be controlled based on a particular application ID. For example, an access policy associated with one of the data packages 110 can restrict access to the data package to applications that have a particular application ID. If the request to access the data package does not originate from an application with the appropriate application ID, access to the data package may be denied, e.g., by the operating system of computing device 102.

The computing device 102 of FIG. 1 is also illustrated as including a browser 112, e.g., a web browser, which is representative of functionality that is configured to navigate via a network 114. Although the network 114 is illustrated as the Internet, the network may assume a wide variety of configurations. For example, the network 114 may include a wide area network (WAN), a local area network (LAN), a wireless network, a public telephone network, an intranet, and so on. Further, although a single network 114 is shown, the network 114 may be configured to include multiple networks.

The browser 112, for instance, may be configured to navigate via the network 114 to interact with data available from one or more web resources 116 as well as communicate data to the one or more web resources 116, e.g., perform downloads and uploads. The web resources 116 may include any suitable computing resource that is configured to provide data and/or content that is accessible via the network 114. Examples of such content include web pages, text content, images, video, audio, and so on.

One or more of the applications 108 may also be configured to access the network 114, e.g., directly themselves and/or through the browser 112. For example, one or more of the applications 108 may be configured to access one or more of the web resources 116 to retrieve and/or upload data. Thus, the applications 108 may also be configured for a variety of functionality that may involve direct or indirect network 112 access. For instance, the applications 108 may include configuration settings and other data that may be leveraged locally by the application 108 as well as synchronized with applications that are executed on another computing device. In this way, these settings may be shared by the devices. A variety of other instances are also contemplated. Thus, the computing device 102 may interact with data in a variety of ways from a variety of different sources.

The computing device 102 is further illustrated as including a data settings handler 118 and a synchronization host ("sync host") 120. The data settings handler 118 is representative of functionality to receive data from various entities of the computing device 102 (e.g., the applications 108 and/or the data packages 110) and determine whether the data is sensitive data or non-sensitive data. Based on this determination, the data settings handler 118 can mark the data as sensitive or non-sensitive prior to passing the data on to other entities. The sync host 120 is representative of functionality to synchronize data between the computing device 102 and other devices, such as another device registered to a user of the computing device 102 that is configured to communicate via the network 114.

Also illustrated as part of the computing device 102 is a security module 122 which includes and/or makes use of security keys 124. The security module 122 is representative of functionality to encrypt and decrypt data for the computing device 102 and/or other entities. The security keys 124 include encryption and/or decryption keys that can be used by the security module 122 to implement encryption and decryption operations.

The environment 100 further includes a synchronization manager ("sync manager") 126, which is representative of functionality to register devices to a user and to enable data to be synchronized between the devices. For example, the computing device 102 can communicate with the sync manager 126 to initiate a user authentication transaction. The authentication transaction can include authentication information provided by a user, such as a username, a password, and so on. Thus, a user can register multiple devices into a synchronization environment via the authentication information.

If the authentication transaction is successful, the computing device 102 can be registered as being associated with a particular user. For example, a device identifier for the computing device 102 can be mapped to a user profile for the user to associate user permissions with the computing device.

Further illustrated as part of the environment 100 is key manager 128, which representative of functionality to manage security keys for various entities. In implementations, when the computing device 102 (or any other device) is registered to a user, the sync manager 126 prompts the key manager 128 to provide security keys associated with the user to the computing device. The security keys can be downloaded by the computing device 102 using a secure data transport technique, such as Secure Sockets Layer (SSL), Transport Layer Security (TLS), and so on. The computing device 102 can use the security keys to encrypt and/or decrypt data.

The environment 100 additionally includes a data storage 130 which stores various types of data, such as encrypted data 132. The data storage 130 is representative of functionality that can be accessed by the computing device 102 and/or other devices via the network 114 to retrieve and/or upload data. In implementations, the data storage 130 can maintain separate data storage compartments for different users such that access to a particular data storage compartment can be restricted to a user with permission to access the compartment.

In implementations, the key manager 128 represents "high cost" storage, whereas the data storage 130 represents "low cost" storage. High cost storage refers to data storage that is protected by a relatively high level of security such that the high cost storage is relatively expensive to implement and maintain. Such expense can be measured both in terms of monetary expense and computing resource expense that is implemented to maintain the high level of security. Low cost storage generally uses lower levels of security than the high cost storage, and thus is typically cheaper to implement and maintain than the high cost storage.

High cost storage can be differentiated from low cost storage in that the high cost storage may meet or exceed a higher level of compliance with established data security standards and procedures than does low cost storage. For example, a user may access low cost storage by providing a username and password that matches a known user profile. Additional user proofs, however, may be implemented to control access to high cost storage. Examples of user proofs are discussed below.

Figure 2:
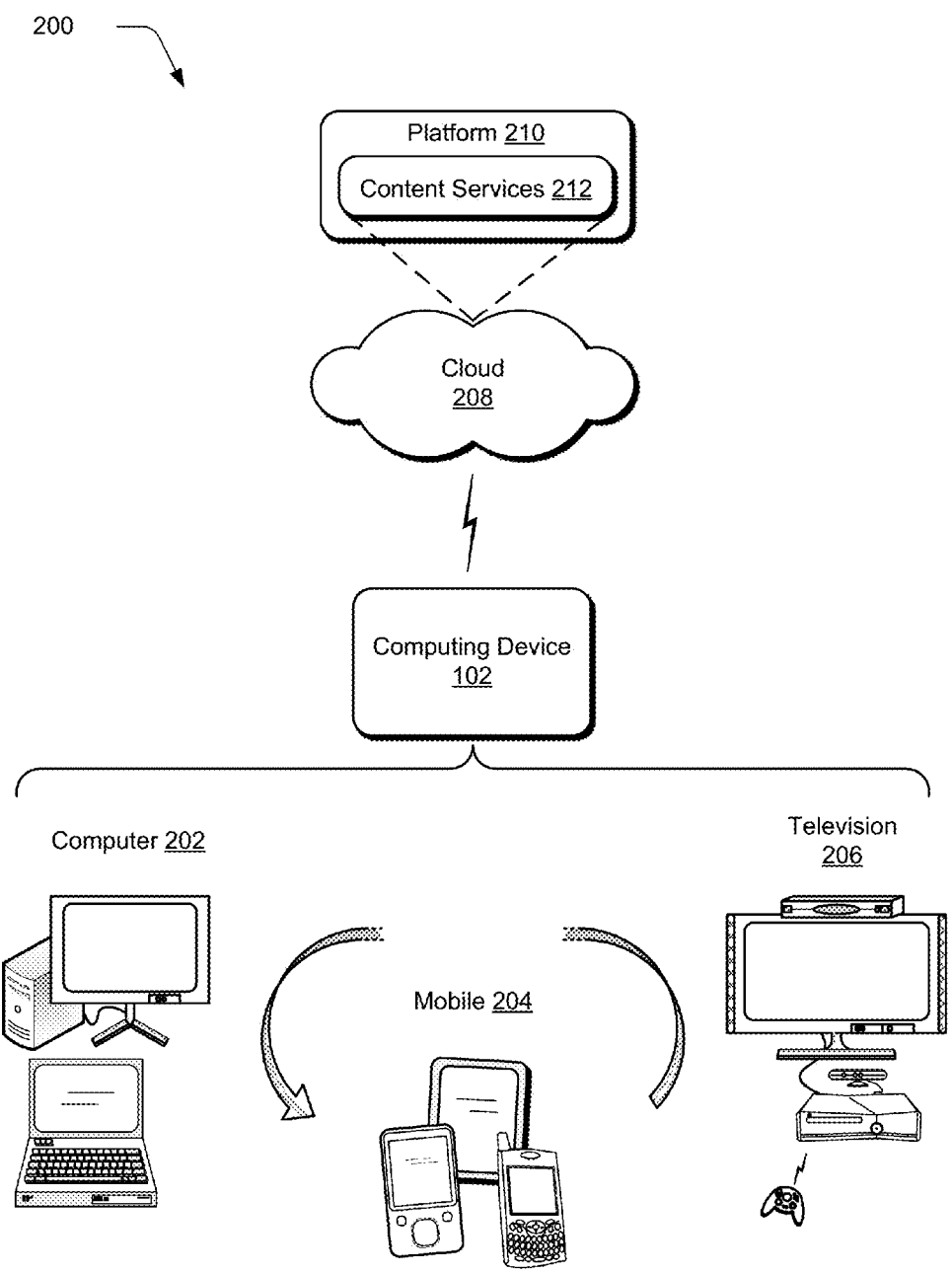
FIG. 2 illustrates an example system that includes the computing device as described with reference to FIGS. 1 and 8.

FIG. 2 illustrates an example system 200 showing the computing device 102 as being implemented in an environment where multiple devices are interconnected through a central computing device. The central computing device may be local to the multiple devices or may be located remotely from the multiple devices. In one embodiment, the central computing device is a "cloud" server farm, which comprises one or more server computers that are connected to the multiple devices through a network or the Internet or other means.

In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices. For example, as previously described the computing device 102 may be configured in a variety of different ways, such as for mobile 202, computer 204, and television 206 uses. Each of these configurations has a generally corresponding screen size and thus the computing device 102 may be configured as one of these device classes in this example system 200. For instance, the computing device 102 may assume the mobile 202 class of device which includes mobile telephones, music players, game devices, and so on.

The computing device 102 may also assume a computer 204 class of device that includes personal computers, laptop computers, netbooks, and so on. The television 206 configuration includes configurations of device that involve display in a casual environment, e.g., televisions, set-top boxes, game consoles, and so on. Thus, techniques described herein may be supported by these various configurations of the computing device 102 and are not limited to the specific examples described in the following sections.

Cloud 208 is illustrated as including a platform 210 for web services 212. The platform 210 abstracts underlying functionality of hardware (e.g., servers) and software resources of the cloud 208 and thus may act as a "cloud operating system." For example, the platform 210 may abstract resources to connect the computing device 102 with other computing devices. The platform 210 may also serve to abstract scaling of resources to provide a corresponding level of scale to encountered demand for the web services 212 that are implemented via the platform 210. A variety of other examples are also contemplated, such as load balancing of servers in a server farm, protection against malicious parties (e.g., spam, viruses, and other malware), and so on.

Thus, the cloud 208 is included as a part of the strategy that pertains to software and hardware resources that are made available to the computing device 102 via the Internet or other networks. For example, secure data synchronization techniques discussed herein may be implemented in part on the computing device 102 as well as via the platform 210 that supports web services 212.

In implementations, input to the computing device 102 may be detected using touchscreen functionality in the mobile configuration 202, track pad functionality of the computer 204 configuration, detected by a camera as part of support of a natural user interface (NUI) that does not involve contact with a specific input device, and so on. Further, performance of the operations to implement techniques discussed herein may be distributed throughout the system 200, such as by the computing device 102 and/or the web services 212 supported by the platform 210 of the cloud 208.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Having described an example environment and example system in which the techniques described herein may operate, consider now a discussion of some example methods in accordance with one or more embodiments.

Example Methods

Discussed below are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100 and the system 200.

Figure 3:
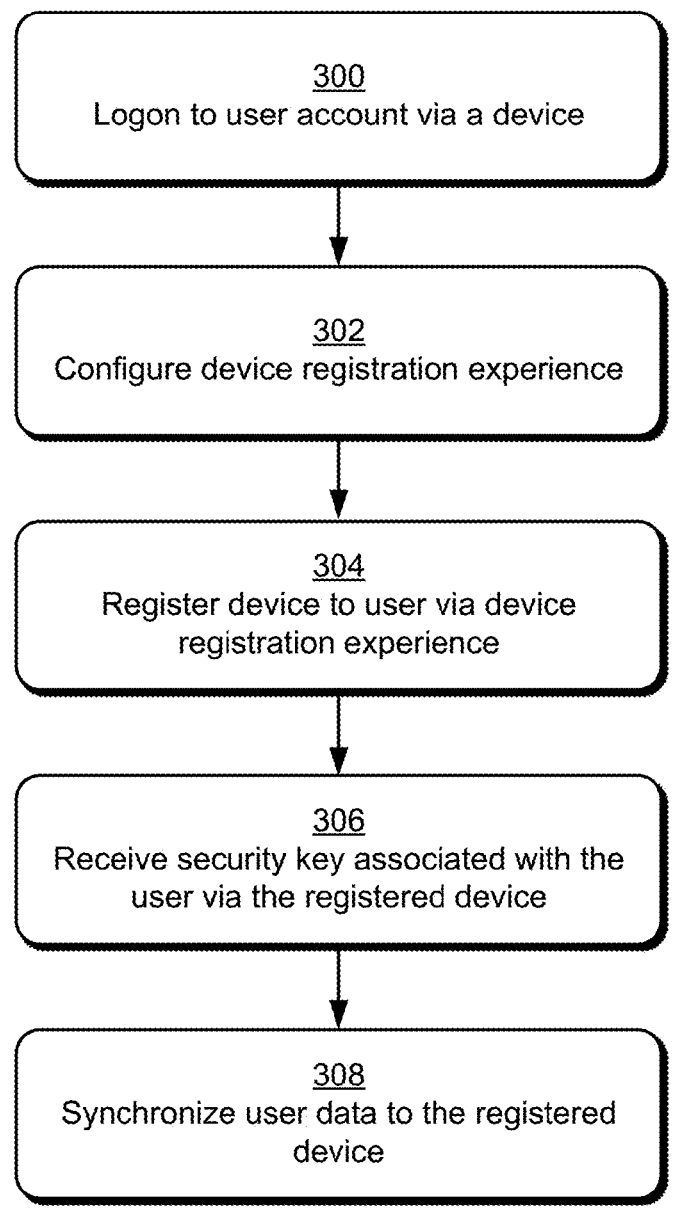
FIG. 3 is a flow diagram that describes steps in a method in accordance with one or more embodiments.

FIG. 3 is a flow diagram that describes steps in a method in accordance with one or more embodiments. Step 300 logs onto a user account via a device. For example, a user can provide a username and password to a user account associated with some type of cloud-based service, such as the data storage 130. The user account can be associated with various types of user permissions and user data, such as user data from the data storage 130. In implementations, logging onto the user account can enable a device to access low cost storage (e.g., the encrypted data 132), but not high cost storage, e.g., the key manager 128. Thus, the device may access encrypted data, but may not have access to a security key to decrypt the encrypted data.

Step 302 configures a device registration experience. For example, a user can specify parameters to be used when the device is registered as being associated with the user. Examples of such parameters include what type and/or how many user proofs are to be requested for a device to be registered as trusted. User proofs can include providing a username and password, sending a confirmation email to the user with a selectable confirmation link, sending a short message service (SMS) message that provides a user-enterable code, biometric authentication, and so on. Additionally or alternatively, a default device registration experience can be specified, e.g., by the sync manager 126.

Step 304 registers a device to a user via the device registration experience. For example, the computing device 102 can communicate with the sync manager 126 and request to be authenticated to the user, e.g., when the computing device is first activated by the user. The user can then provide user proofs requested by the sync manager 126, which causes the device to be registered as being a trusted device. Alternatively, if the user fails to correctly provide one or more of the requested user proofs, the device registration can fail and the device will not be registered as trusted.

Step 306 receives a security key associated with the user via the registered device. For example, the sync manager 126 can communicate to the key manager 128 that the computing device 102 is a trusted device, and the key manager can provide one or more security keys to the computing device. The security keys can be used to encrypt and/or decrypt data for the computing device.

Step 308 synchronizes user data to the registered device. For example, user data from the data storage 130 and/or other user devices can be uploaded to and/or downloaded by the computing device 102. Additionally, user data from the computing device 102 can be uploaded to the data storage 130 and/or other user devices. In implementations, synchronizing the user data to the registered device can cause application states for various applications (e.g., for the applications 108) over multiple devices to be synchronized. Further aspects of data synchronization are discussed in more detail below.

Figure 4:
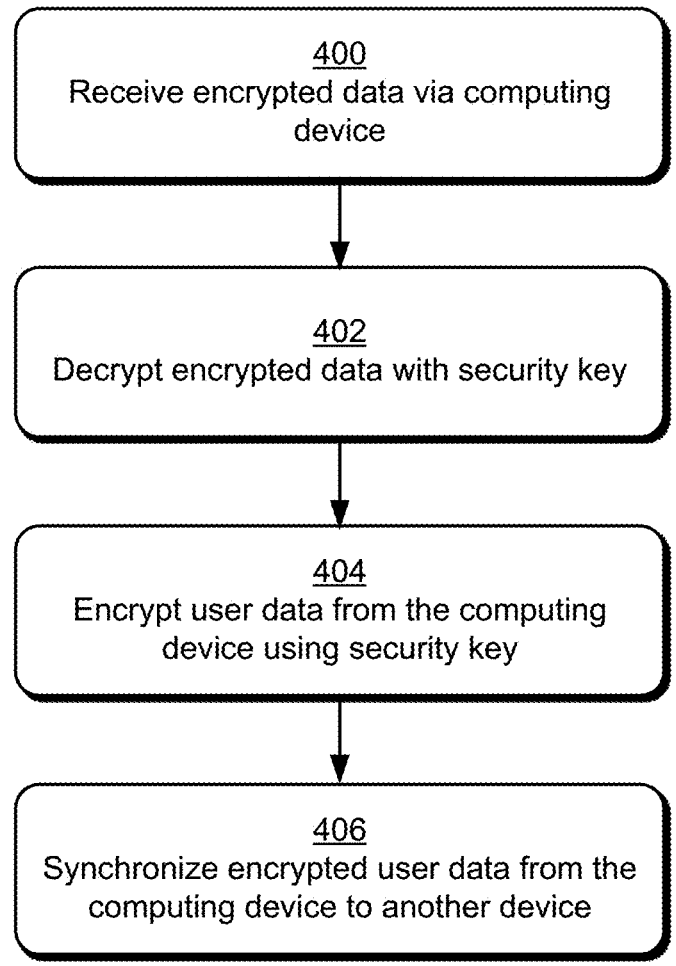
FIG. 4 is a flow diagram that describes steps in a method in accordance with one or more embodiments.

FIG. 4 is a flow diagram that describes steps in a method in accordance with one or more embodiments. In implementations, the method describes a detailed implementation of step 308, discussed above with respect to FIG. 3.

Step 400 receives encrypted user data via a computing device. For example, encrypted user data can be received from the encrypted data 132 as part of the data storage 130. Step 402 decrypts the encrypted data with a security key. For example, the sync host 120 can pass the encrypted data to the security module 122 and request that the security module decrypt the encrypted data. The security module 122 can decrypt the encrypted data using a security key received from the key manager 128. Step 404 encrypts user data from the computing device using a security key. For example, the security module 122 can encrypt the user data using the same security key that was used to decrypt the encrypted data and/or a different security key.

Step 406 synchronizes the encrypted user data from the computing device to another device. For example, the encrypted user data can be transmitted to the data storage 130 and saved to the encrypted data 132. Additionally or alternatively, the encrypted user data can be transmitted to one or more other devices registered to the user.

Application-Specific Data

In implementations, access to data can be controlled based on a correlation between applications that submit data and applications that request data. This can prevent data associated with a particular application from being accessed by other, unauthorized applications.

Figure 5:
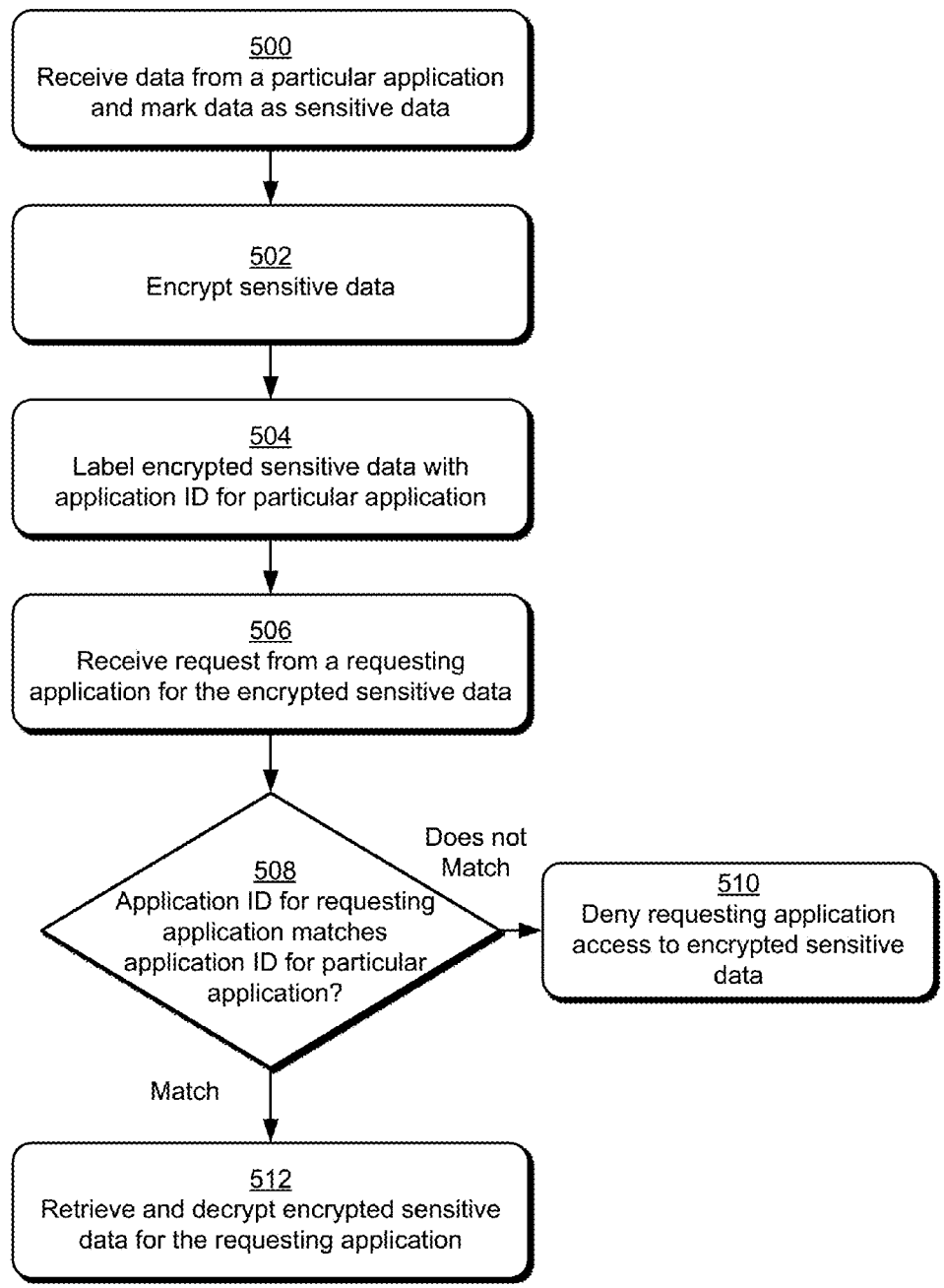
FIG. 5 is a flow diagram that describes steps in a method in accordance with one or more embodiments.

FIG. 5 is a flow diagram that describes steps in a method in accordance with one or more embodiments. Step 500 receives data from a particular application and marks the data as sensitive data. For example, the data settings handler 118 can receive data from one of the applications 108 and/or one of the data packages 110, and can ascertain that the data is sensitive data. The data can be ascertained to be sensitive data based on an indication from the particular application that the data is sensitive data, and/or based on the nature of the data itself. For example, user credentials (e.g., a username and/or password) can be considered to be sensitive data. User credentials can enable access to various types of user data and user resources, such as a banking resource, a social media resource, an education resource, and so on.

Further to implementations, the data settings handler 118 can mark the data as sensitive data and pass the marked data to the sync host 120 for further routing.

Step 502 encrypts the sensitive data. For example, the sync host 120 can receive the data and ascertain that the data is marked as sensitive data. The sync host can pass the sensitive data to the security module 122 and request that the security module encrypt the data, e.g., with one of the security keys 124.

Step 504 labels the encrypted sensitive data with an application ID for the particular application. Application IDs are discussed in more detail above. In implementations, the labeled encrypted data can be communicated to the data storage 130 and stored as part of the encrypted data 132. Step 506 receives a request from a requesting application for the encrypted sensitive data. For example, a device other than the computing device 102 can request the encrypted sensitive data, e.g., as part of a data synchronization procedure.

Step 508 ascertains whether an application ID for the requesting application matches the application ID for the particular application. For example, a settings handler executing on the device on which the requesting application resides can query an operating system or other component of the device for an application ID for the requesting application. If the application ID for the requesting application does not match the application ID for the particular application ("Does not match"), step 510 denies the requesting application access to the encrypted sensitive data.

If the application ID for the requesting application matches the application ID for the particular application ("Match"), step 512 retrieves and decrypts the encrypted sensitive data for the requesting application. For example, the security module 122 can decrypt the encrypted sensitive data before the data is passed to the requesting application.

In implementations, the particular application and the requesting application can be different instances of the same application that reside on different devices associated with a user. For example, both applications can be instances of a word processing application, and thus techniques discussed herein can be implemented to synchronize documents between the instances of the word processing application. In implementations, the requesting application can decrypt the encrypted sensitive data, e.g., using one or more of the security keys 124.

Enterprise Data Synchronization

Techniques discussed herein can enable a user's data to be securely synchronized to a variety of devices associated with the user. In some scenarios, however, it can be desirable to control to which of the user's devices certain types of data get synchronized. For example, synchronization of enterprise data can be limited to devices with enterprise-type permissions and/or policies. This can prevent sensitive work-related data from being synchronized from an enterprise device to a personal device unless there is an indication that such synchronization is permitted. Examples of enterprise data include business data, work-related data, and so on. Similarly, the types of data that get synced to a particular device can be controlled. For instance, an enterprise device can block synchronization of sensitive personal data, e.g., from another device to the enterprise device, and vice versa.

Figure 6:
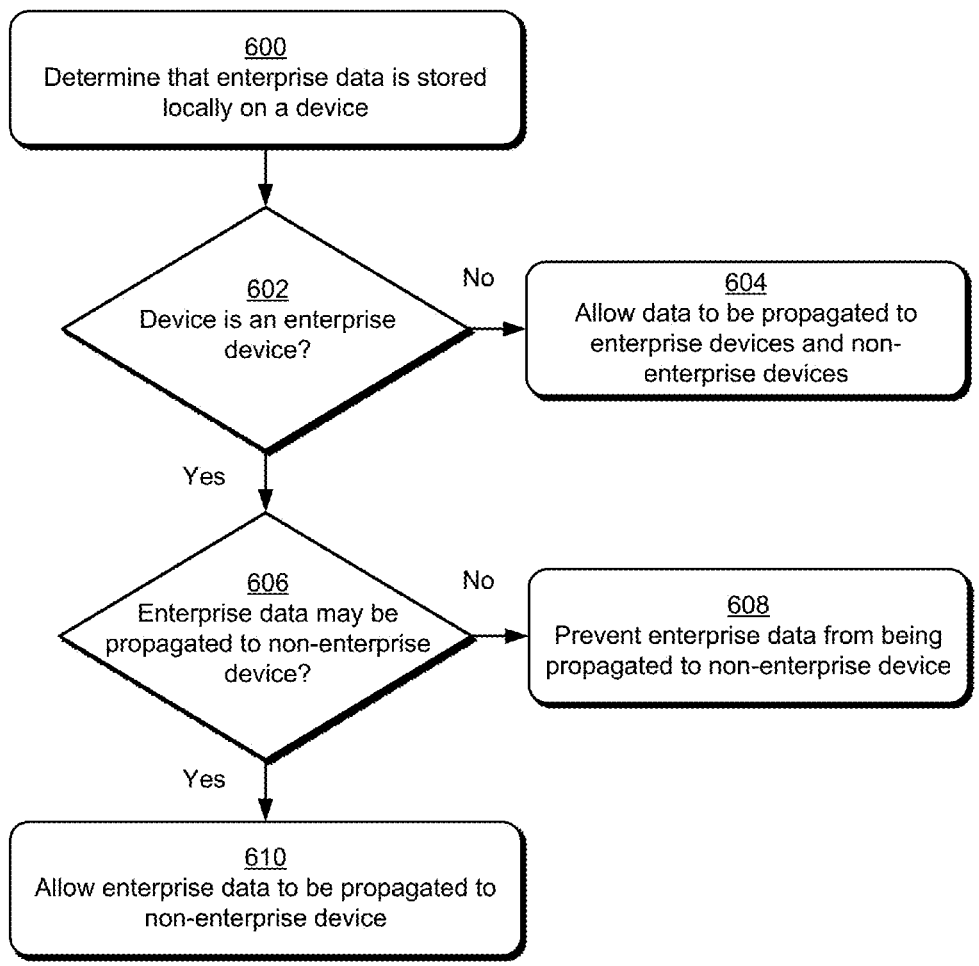
FIG. 6 is a flow diagram that describes steps in a method in accordance with one or more embodiments.

FIG. 6 is a flow diagram that describes steps in a method in accordance with one or more embodiments. Step 600 determines that enterprise data is stored locally on a device. For example, the data can be determined to be enterprise data based on a device type for the device, a type of application that generates the data, the nature of the data itself (e.g., sales data), and so on.

Step 602 ascertains whether the device is an enterprise device. In implementations, an enterprise device can be a device that is located solely or primarily at an enterprise location. Alternatively or additionally, the enterprise device can be a device with enterprise-type policies, such as a portable device that can be used to perform enterprise tasks. For example, an enterprise device can include a laptop or other mobile device that is issued by an enterprise entity to a user associated with the enterprise.

As a further example, the enterprise device can be a mixed-use device, e.g., a device that can be used for both enterprise and non-enterprise (e.g., personal) purposes. For instance, certain portions of a device can be characterized as enterprise portions, and other portions as non-enterprise portions. Such portions can include applications, memory partitions, databases, and so on.

If the device is not an enterprise device ("No"), step 604 allows the enterprise data to be propagated to enterprise devices and non-enterprise devices. For example, the device can be a personal and/or or home device, and the enterprise data can be propagated from the device to a work device. If the device is an enterprise device ("Yes"), step 606 ascertains whether the enterprise data may be propagated to a non-enterprise device. While not expressly illustrated here, if step 602 ascertains that the device is an enterprise device, in implementations the enterprise data may be propagated to a different enterprise device.

If the enterprise data may not be propagated to a non-enterprise device ("No"), step 608 prevents the enterprise data from being propagated to a non-enterprise device. For example, a data synchronization policy associated with the enterprise device can indicate that enterprise data is not to be propagated to non-enterprise devices.

If the enterprise data may be propagated to a non-enterprise device ("Yes"), step 610 allows the enterprise data to be propagated to a non-enterprise device. For example, permission to propagate enterprise data to a non-enterprise device can be implied from user actions. For instance, if a user expressly enters and/or transmits enterprise data to a non-enterprise device, it can be implied that enterprise data is permitted to be propagated to the non-enterprise device. As a further example, a permission associated with an enterprise device can specify that if data of a certain type was previously transmitted from a non-enterprise device to the enterprise device, data of the same or similar type can be synced from the enterprise device to the non-enterprise device and/or a different non-enterprise device. Alternatively or additionally, permissions associated with the enterprise data, the enterprise device, and/or the non-enterprise device can indicate that enterprise data may be propagated to the non-enterprise device.

As mentioned above, propagation of data can also be controlled based on the type of data. For example, an enterprise device can prevent sensitive personal data from being synced from a personal, non-enterprise device, to the enterprise device. Other sync policies can specify sync parameters and permissions based on a variety of different data and device types.

As a further example, permissions associated with an enterprise device can specify a type of storage that enterprise data may be propagated to. For example, a permission can indicate that data may or may not be propagated to a high cost storage, a low cost storage, and so on.

While embodiments are discussed with reference to controlling access to enterprise data, the techniques can be employed to control access to a variety of different types of data. For example, the techniques can be employed to control access to educational data, healthcare data, personal data, and so on.

Revoking Trusted Status

In implementations, a user may want to revoke the trusted status of a device that has been registered to the user. For example, if a registered device is lost or stolen, a user can revoke the trusted status of the device such that the device cannot access the user's security keys and/or sensitive user data.

Figure 7:
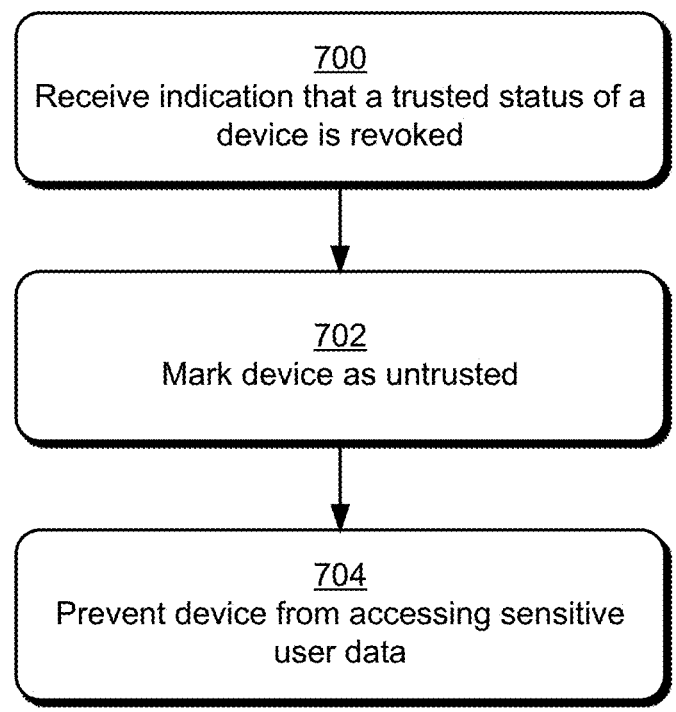
FIG. 7 is a flow diagram that describes steps in a method in accordance with one or more embodiments.

FIG. 7 is a flow diagram that describes steps in a method in accordance with one or more embodiments. Step 700 receives an indication that a trusted status of a device is revoked. For example, a user can communicate to the sync manager 126 or other entity via a different device that a previously trusted device is untrusted. A user can also log onto a user profile associated with the user's devices and revoke the trusted status of a device. Step 702 marks the device as untrusted. For example, the sync manager 126, the key manager 128, and/or the data storage 130 can mark the device as untrusted.

Step 704 prevents the device from accessing sensitive user data. For example, a request from the device for user data (e.g., a security key and/or any other type of user date) may be denied. Additionally or alternatively, a security key already stored on the untrusted device can be revoked. For example, encrypted user data can be re-encrypted with a different security key, which can be provided to trusted devices but not the untrusted device. Thus, a security key already stored on the untrusted device will not be effective to decrypt the re-encrypted data.

Example Device

Figure 8:
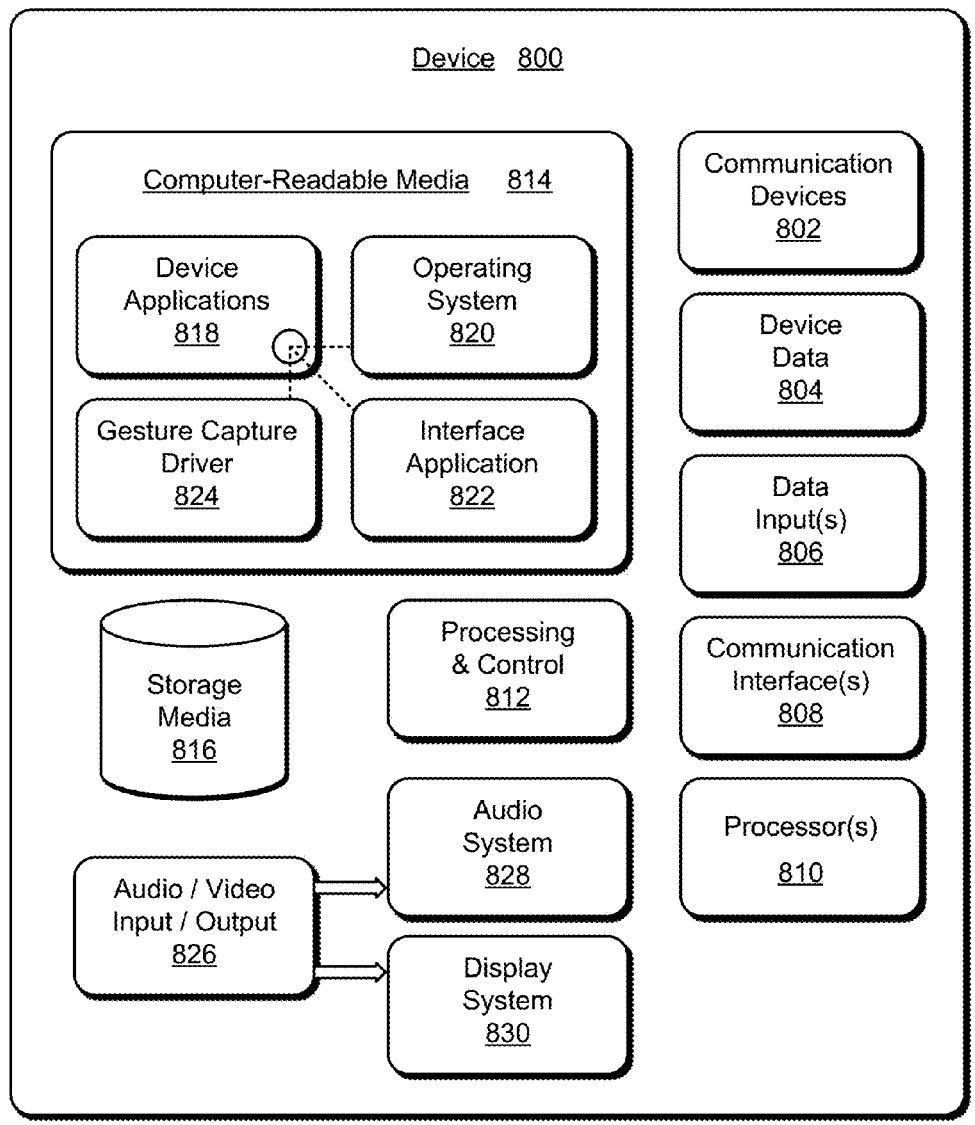
FIG. 8 illustrates an example computing device that can be utilized to implement various embodiments described herein.

FIG. 8 illustrates various components of an example device 800 that can be implemented as any type of portable and/or computer device as described with reference to FIGS. 1 and 2 to implement embodiments of the secure data synchronization techniques described herein. Device 800 includes communication devices 802 that enable wired and/or wireless communication of device data 804 (e.g., received data, data that is being received, data scheduled for broadcast, data packets of the data, etc.). The device data 804 or other device content can include configuration settings of the device, media content stored on the device, and/or information associated with a user of the device. Media content stored on device 800 can include any type of audio, video, and/or image data. Device 800 includes one or more data inputs 806 via which any type of data, media content, and/or inputs can be received, such as user-selectable inputs, messages, music, television media content, recorded video content, and any other type of audio, video, and/or image data received from any content and/or data source.

Device 800 also includes communication interfaces 808 that can be implemented as any one or more of a serial and/or parallel interface, a wireless interface, any type of network interface, a modem, and as any other type of communication interface. The communication interfaces 808 provide a connection and/or communication links between device 800 and a communication network by which other electronic, computing, and communication devices communicate data with device 800.

Device 800 includes one or more processors 810 (e.g., any of microprocessors, controllers, and the like) which process various computer-executable or readable instructions to control the operation of device 800 and to implement the gesture embodiments described above. Alternatively or in addition, device 800 can be implemented with any one or combination of hardware, firmware, or fixed logic circuitry that is implemented in connection with processing and control circuits which are generally identified at 812. Although not shown, device 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 800 also includes computer-readable media 814, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 800 can also include a mass storage media device 816.

Computer-readable media 814 provides data storage mechanisms to store the device data 804, as well as various device applications 818 and any other types of information and/or data related to operational aspects of device 800. For example, an operating system 820 can be maintained as a computer application with the computer-readable media 814 and executed on processors 810. The device applications 818 can include a device manager (e.g., a control application, software application, signal processing and control module, code that is native to a particular device, a hardware abstraction layer for a particular device, etc.), as well as other applications that can include, web browsers, image processing applications, communication applications such as instant messaging applications, word processing applications and a variety of other different applications. The device applications 818 also include any system components or modules to implement embodiments of the secure data synchronization techniques described herein.

In this example, the device applications 818 include an interface application 822 and a gesture-capture driver 824 that are shown as software modules and/or computer applications. The gesture-capture driver 824 is representative of software that is used to provide an interface with a device configured to capture a gesture, such as a touchscreen, track pad, camera, and so on. Alternatively or in addition, the interface application 822 and the gesture-capture driver 824 can be implemented as hardware, software, firmware, or any combination thereof.

Device 800 also includes an audio and/or video input-output system 826 that provides audio data to an audio system 828 and/or provides video data to a display system 830. The audio system 828 and/or the display system 830 can include any devices that process, display, and/or otherwise render audio, video, and image data. Video signals and audio signals can be communicated from device 800 to an audio device and/or to a display device via an RF (radio frequency) link, S-video link, composite video link, component video link, DVI (digital video interface), analog audio connection, or other similar communication link. In an embodiment, the audio system 828 and/or the display system 830 are implemented as external components to device 800. Alternatively, the audio system 828 and/or the display system 830 are implemented as integrated components of example device 800.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   determining that enterprise data is stored locally on a first device, the first device corresponding to an enterprise device based on an association with at least one enterprise policy or permission;
   receiving a request to propagate the enterprise data from the first device to a second device;
   determining whether the second device is an enterprise device or a non-enterprise device;
   based at least on a determination that the second device is a non-enterprise device based on a lack of the association with at least one enterprise policy or permission, determining whether a propagation permission associated with the first device indicates that the first device is permitted to propagate the enterprise data to non-enterprise devices; and
   based at least on a determination that the first device lacks permission to propagate the enterprise data to a non-enterprise device, preventing the enterprise data from being propagated from the first device to the second device.

2. The method as recited in claim 1, further comprising identifying the enterprise data based on at least one of a device type of the first device, a type of application that generates the enterprise data, or a nature of the enterprise data itself.

3. The method as recited in claim 1, wherein the propagation permission associated with the first device includes a data synchronization policy that indicates that the enterprise data is not to be propagated to a non-enterprise device.

4. The method as recited in claim 1, wherein the propagation permission associated with the first device permits the enterprise data to be propagated to a particular non-enterprise device, wherein the first device has previously propagated other enterprise data to the particular non-enterprise device.

5. The method as recited in claim 1, wherein the permission associated with the first device permits the enterprise data to be propagated to a particular non-enterprise device, wherein the enterprise data includes a first type of data that is a same type as a second type of data that was previously transmitted from the first device to the particular non-enterprise device.

6. The method as recited in claim 1, wherein the enterprise data includes one or more of business data or work-related data.

7. The method as recited in claim 1, wherein the determination that the first device lacks permission to propagate the enterprise data to non-enterprise devices includes a determination that an additional permission associated with the enterprise data indicates that the enterprise data is not permitted to be propagated to non-enterprise devices.

8. The method as recited in claim 1, wherein propagation of the enterprise data is controlled based on a type of the enterprise data.

9. The method as recited in claim 1, wherein the propagation permission specifies a type of storage to which the enterprise data may be propagated.

10. A system comprising:
    one or more processors; and
    one or more computer-readable hardware storage media storing computer-executable instructions which are executable by the one or more processors to cause the system to perform operations including:
    identifying an association of a first device with at least one enterprise policy or permission;
    determining that enterprise data is stored locally on the first device, the first device corresponding to an enterprise device based on the association with at least one enterprise policy or permission;
    receiving a request to propagate the enterprise data from the first device to a second device;
    determining whether the second device is an enterprise device or a non-enterprise device;
    based at least on a determination that the second device is a non-enterprise device made by identifying a lack of an association of the second device with at least one enterprise policy or permission, determining whether the enterprise data is permitted to be propagated to non-enterprise devices based on a propagation permission associated with one of the first device or the enterprise data; and
    based at least on the propagation permission indicating that the enterprise data is not to be propagated to a non-enterprise device, preventing the enterprise data from being propagated from the first device to the second device.

11. The system as recited in claim 10, wherein:
    the propagation permission is associated with the first device; and
    the propagation permission specifies that a particular type of data was previously transmitted from the non-enterprise device to the first device, wherein additional data of a same type as the particular type of data is permitted to be propagated from the first device to the non-enterprise device.

12. The system as recited in claim 10, wherein the operations further comprise identifying the enterprise data based on at least one of a device type of the first device, a type of application that generates the enterprise data, or a nature of the enterprise data itself.

13. The system as recited in claim 10, wherein the propagation permission specifies a type of storage to which the enterprise data is permitted to be propagated.

14. The system as recited in claim 10, wherein the propagation permission includes a data synchronization policy that indicates that the enterprise data is not to be propagated to the non-enterprise device.

15. The system as recited in claim 10, wherein propagation of the enterprise data is controlled based on a type of the enterprise data, the type including at least one sensitive personal data or sensitive work-related data.

16. A method comprising:
    determining that enterprise data is stored locally on a device having an association with at least one enterprise policy or permission;
    ascertaining whether the enterprise data is permitted to be propagated to a different device based at least in part on whether the different device is an enterprise device or a non-enterprise device; and
    in an event that the different device is a non-enterprise device according to a lack of an association of the different device with at least one enterprise policy or permission, preventing the enterprise data from being propagated to the non-enterprise device unless a propagation permission associated with the device indicates that the enterprise data is permitted to be propagated to the non-enterprise device.

17. The method as recited in claim 16, further comprising identifying the enterprise data based on at least one of a device type of the device, a type of application that generates the enterprise data, or a nature of the enterprise data itself.

18. The method as recited in claim 16, wherein the propagation permission associated with the device includes a data synchronization policy that indicates that the enterprise data is not to be propagated to a non-enterprise device.

19. The method as recited in claim 16, wherein the propagation permission associated with the enterprise device indicates that the enterprise data is permitted to be propagated to the non-enterprise device based on an indication that the device has previously propagated other enterprise data to the non-enterprise device.

20. The method as recited in claim 16, wherein the propagation permission associated with the enterprise device indicates that the enterprise data is permitted to be propagated to the non-enterprise device based at least on the enterprise data including a first type of data that is a same type as a second type of data that was previously transmitted from the device to the non-enterprise device.

21. A method comprising:

determining that enterprise data is stored on an enterprise portion of a device, the enterprise portion of the device having an association with at least one enterprise policy or permission;

receiving a request to propagate the enterprise data from the enterprise portion of the device to a non-enterprise portion of the device, the non-enterprise portion of the device lacking the association with at least one enterprise policy or permission;

determining whether a propagation permission associated with the enterprise portion of the device indicates that the enterprise portion of the device is permitted to propagate the enterprise data to the non-enterprise portion of the device; and based at least on a determination that the enterprise portion of the device lacks permission to propagate the enterprise data to the non-enterprise portion of the device, preventing the enterprise data from being propagated from the enterprise portion of the device to the non-enterprise portion of the device.

\* \* \* \* \*